Sept. 6, 1955 M. L. BURDEN 2,716,830
FISH LURE
Filed April 20, 1953

Martin L. Burden
INVENTOR.

BY Clarence A. O'Brien
and Harvey B. Jackson
Attorneys

United States Patent Office 2,716,830
Patented Sept. 6, 1955

2,716,830

FISH LURE

Martin L. Burden, Alexandria, Ind.

Application April 20, 1953, Serial No. 349,900

1 Claim. (Cl. 43—42.06)

This invention relates to new and useful improvements in fish lures and the primary object of the present invention is to provide a fish lure having a gas producing chamber with an outlet that will be located below the surface of a fluid medium in which the lure is placed so that gas bubbles passing from the outlet means will move the fish lure.

Another important object of the present invention is to provide a fish lure adapted to receive a chemical which when mixed with water will cause the lure to move within a fluid medium to attract fish thereto.

These and other objects and advantages which will become subsequently apparent reside in the details of construction and operation as more fully hereinafter described and claimed, references being had to the accompanying drawing forming a part hereof, wherein like numerals refer to like parts throughout, and in which:

Figure 1:
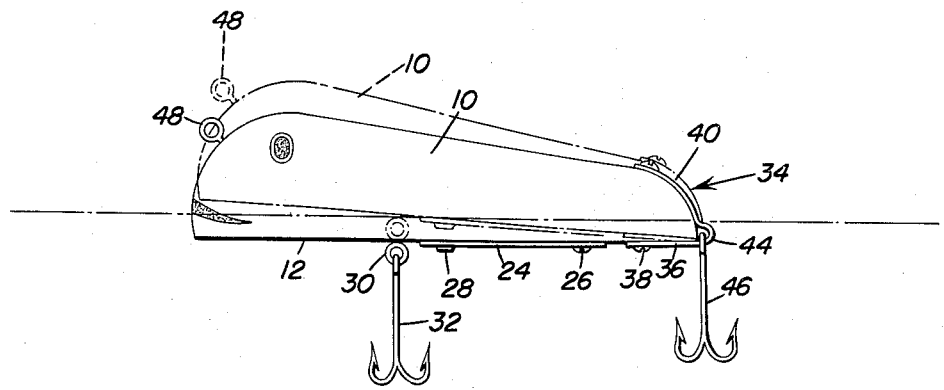
Figure 1 is a side elevational view of the present invention and with dotted lines showing the manner in which the lure tilts upwardly as gas is discharged therefrom.
Figure 2:
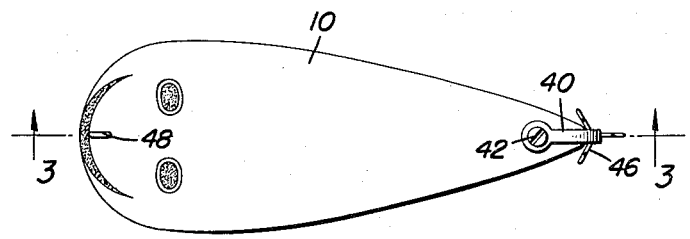
Figure 2 is a top plan view of Figure 1.
Figure 3:
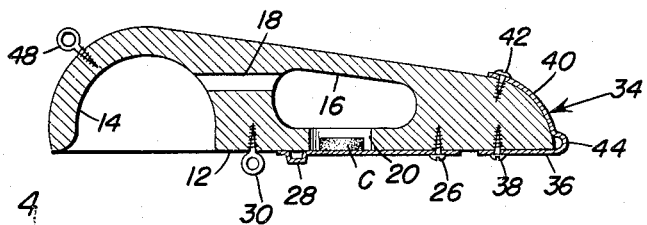
Figure 3 is a longitudinal vertical sectional view taken substantially on the plane of section line 3—3 of Figure 2, and with the forward and rear hooks removed.
Figure 4:
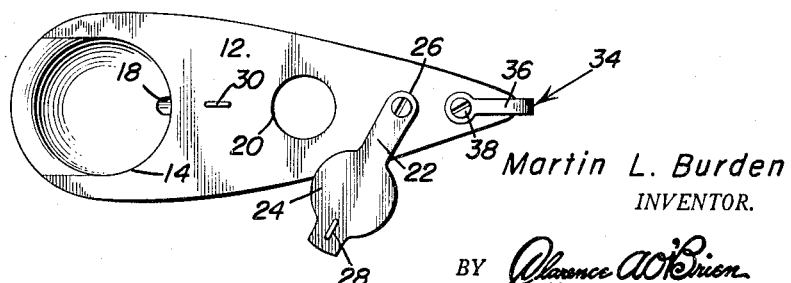
Figure 4 is a bottom plan view of Figure 1 with the hooks removed and showing the closure pivoted to its open position.

Referring now to the drawings in detail, wherein for the purpose of illustration, there is disclosed a preferred embodiment of the present invention, the numeral 10 represents an elongated rearwardly tapering body member of buoyant material having a flat lower wall or undersurface 12.

An upwardly concave recess 14 is provided in the undersurface of the body member 10 at the forward end portion thereof and communicates with a gas chamber 16 in the intermediate portion of the body member 10 through the medium of a relatively small longitudinal passage 18 that extends from the upper portion of recess 14 to the upper portion of chamber 16.

Chamber 16 is provided with an entrance 20 at the undersurface 12 so that a chemical C, such as an oxygen or other chemical tablet, may be placed in the chamber 16 to produce gas when water contacts the chemical.

The reduced rearwardly extending end portion 22 of a relatively flat closure or plate 24 is pivotally attached to the bottom of the body member 10 by a pivot fastener 26 that extends upwardly through portion 22 into the undersurface of the body member behind entrance 20. A fingergrip forming detent 28 on the closure 24 provides means whereby the closure may be swung about the pivot fastener to ride against undersurface 12 and be frictionally locked against the undersurface 12 in a closed position.

An eye fastener 30 is secured to and extends downwardly from the body member 10 between recess 14 and entrance 20 to support a forward gang hook 32. A hook holder 34 is engaged over the rear end of body member 10 and includes a lower flat limb 36 that is secured against surface 12 by a fastener 38 and a concavo-convexed limb 40 that is secured against the convexed rear end of body member 10 by a fastener 42. Limb 40 is provided with a depression 44 opening toward the rear end of the body member 10 and adapted to receive the eye of a rear gang hook 46.

The forward end of the body member 10 supports an eye fastener 48 that is adapted to engage a fishing line (not shown), whereby the lure may be reeled in when a fish strikes bait on one of the gang of hooks.

In practical use of the present invention, a chemical tablet C is placed in the chamber 16 after which the closure is moved to its closed position. The lure is placed in the water and water will enter recess 14 and pass into chamber 16 through passageway 18 to mix with the chemical tablet in order to produce gas. The gas bubbles produced in chamber 16 will pass through passageway 18 and enter recess 14. The bubbles of gas in recess 14 will join and become enlarged so that relatively large bubbles will exit from recess 14 to produce a sound and lift the front end of member 10 while moving the member 10 forwardly to attract fish thereto.

Obviously, the lure may be constructed from any suitable buoyant material with the recess 14, passageway 18, chamber 16 and entrance 20 carved, or formed in any suitable manner in the body member. The body member 10 may be exteriorly painted or colored with eyes and a mouth provided thereon to more effectively attract fish thereto.

I claim:

A fish lure adapted to float on the water comprising a buoyant elongated body having closed front and rear ends, said body having a chamber formed therein adapted to contain a chemical capable of generating a gas when mixed with water to form bubbles in said chamber, said body having an upwardly arched recess formed therein adjacent to and spaced from said front end and opening downwardly into the water adjacent the front end of the body to receive water therein, said body having a longitudinal passage between the upper portions of the recess and chamber for admitting water from the recess into the chamber and bubbles from the chamber into the recess, said passage being smaller in area than either said recess or chamber to retard the passage of bubbles from the chamber into the recess and said recess being larger in area than said chamber for collection and expansion of bubbles and gas therein until the gas pressure in said recess raises the front end of the body upwardly out of the water for escape of the bubbles and gas from said recess to produce a sound in the water.

References Cited in the file of this patent

UNITED STATES PATENTS

| | | |
|---|---|---|
| 670,727 | Poli | Mar. 26, 1901 |
| 1,659,129 | Asaro | Feb. 14, 1928 |
| 2,256,813 | Mikina | Sept. 23, 1941 |
| 2,415,742 | Hiltabidel et al. | Feb. 11, 1947 |
| 2,497,846 | Burroughs | Feb. 21, 1950 |
| 2,543,464 | McPherson | Feb. 27, 1951 |
| 2,636,316 | Solovioff | Apr. 28, 1953 |